US 8,762,781 B2

(12) United States Patent
Blouin et al.

(10) Patent No.: US 8,762,781 B2
(45) Date of Patent: Jun. 24, 2014

(54) METHOD AND APPARATUS USEFUL IN MANUFACTURING TEST CASE OPERATIONS

(75) Inventors: Eric E. Blouin, Ardmore, PA (US); Peter P Lai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 12/947,269

(22) Filed: Nov. 16, 2010

(65) Prior Publication Data

US 2012/0124425 A1    May 17, 2012

(51) Int. Cl.
*G06F 11/00* (2006.01)
(52) U.S. Cl.
USPC .......................................... 714/32; 717/124
(58) Field of Classification Search
USPC ............................................................ 714/32
See application file for complete search history.

(56) References Cited

U.S. PATENT DOCUMENTS

| | | | |
|---|---|---|---|
| 5,146,460 A * | 9/1992 | Ackerman et al. .............. 714/33 |
| 5,283,896 A | 2/1994 | Temmyo et al. | |
| 5,581,699 A | 12/1996 | Casal et al. | |
| 5,787,269 A | 7/1998 | Hyodo | |
| 5,845,064 A * | 12/1998 | Huggins ......................... 714/33 |
| 6,292,909 B1 * | 9/2001 | Hare ................................ 714/40 |
| 6,684,169 B2 | 1/2004 | Masella, Jr. | |
| 7,512,933 B1 * | 3/2009 | Tortosa et al. ................ 717/124 |
| 2007/0220338 A1 * | 9/2007 | Birmiwal et al. ............... 714/33 |
| 2008/0010542 A1 * | 1/2008 | Yamamoto et al. ............. 714/38 |
| 2009/0043559 A1 * | 2/2009 | Behm et al. ..................... 703/16 |
| 2011/0307860 A1 * | 12/2011 | Park et al. ..................... 717/107 |

OTHER PUBLICATIONS

Qiao et al, Data Driven Design and Simulation System Based on XML, Proceedinsg of the 2003 Winter Simulation Conference.
Ufimtsev et al, Performance Modelling of a JavaEE Component Application Using Layered Queuing Networks: Revised Approach and a Case Study, Fifth International Workshop on Specification and Verification of Component-Based Systems, 2006.
Sawaya, Using Emperical Demand Data and Common Random Numbers in an Agent-Based Simulation of a Distribution Network, 2007.

* cited by examiner

*Primary Examiner* — Kamini Patel
(74) *Attorney, Agent, or Firm* — Steven L. Bennett; Daniel E. McConnell

(57) ABSTRACT

The incorporation of a simulation mode into existing manufacturing code test cases that communicate with a service processor. While in simulation mode, the test cases are able to run independently of system hardware or network connection. Test case code paths are exercised through the modification of simulated output, without change to the original code.

15 Claims, 3 Drawing Sheets

METHOD AND APPARATUS USEFUL IN MANUFACTURING TEST CASE OPERATIONS

FIELD AND BACKGROUND OF INVENTION

The technology here described relates to the manufacture of computer systems.

Currently, the manufacturing test of computer systems, and particularly for server systems from low-end to high-end systems, involves a high amount of interaction with the System Under Test (SUT) Service Processor (SP). This interaction with the SP forms the basis from which a suite of manufacturing test cases are developed in order to either stress the SUT's hardware or perform other manufacturing process actions. From the beginning of development all the way through the production phases of the computer system product, there are a number of issues encountered that hinder the development, maintenance, and debug of the software test cases.

These issues include:

There likely is limited hardware available during development with which software engineers may prototype and develop test cases, yet there is a business expectation to have the test cases ready for manufacturing production within a short time frame.

There may be a constant and rapid succession of SP driver releases from the initiation of development up to general availability of the computer system product with SP command functionality and output format changing, often without notice. This can cause test case code to break, and in turn require time and resource to fully debug.

Large configured systems can cause configuration dependent SP commands to take a significantly longer time to execute. This impedes the development and debug of the test case code.

Limited hardware configurations available for test case development may make it difficult to verify all good and bad code paths. Even if every configuration were available, it would be very time consuming to run through all the varying scenarios.

There is a need in manufacturing operations to debug failed test cases quickly because any extended time allocated for debug could prevent the computer system under test from shipping to the customer.

Test case debug may be hindered by poor code readability, especially in segments that perform extensive data manipulation, which makes it difficult to interpret and piece together the original output context.

With server development being on shorter cycles, hardware availability becoming increasingly limited due to higher costs, in addition to systems becoming larger and more complex, manufacturing test cases need to be prototyped earlier and debugged faster but still retain a high quality standard of code.

SUMMARY OF THE INVENTION

With the foregoing in mind, what is here taught provides for the incorporation of a simulation mode (also herein "sim mode") into existing manufacturing code test cases that communicate with the service processor. While in sim mode, the test cases would be able to run independent of system hardware or network connection. Test case code paths would be exercised through the modification of simulated output, without change to the original code.

Methods and apparatus in which a simulation mode is enabled in accordance with this disclosure provide a number of advantages. The ability to prototype test cases with limited time on hardware (eg get on a system just to copy the outputs for the various SP commands used in your test case, and afterwards prototype the test case code offline in sim mode) is enabled. Shorter debug cycle times in manufacturing support revenue for business (eg quickly recreate fails by copying over the failed output to the sim file). Allocated time of test fixtures is reduced. Code quality is improved, through the ability to test more code paths (bad, good, and configuration dependent paths). Code readability is increased because the corresponding output for the SP command is defined in the sim file. Simulation integration is transparent to the coder. Existing test cases minimally modified for simulation support. (i.e. No "if sim mode, else conditionals"). Code changes may be verified more quickly. Batch list (test case sequencer) flows may be verified, especially when they contain test cases that effect subsequent test cases in the flow.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

Figure 1:
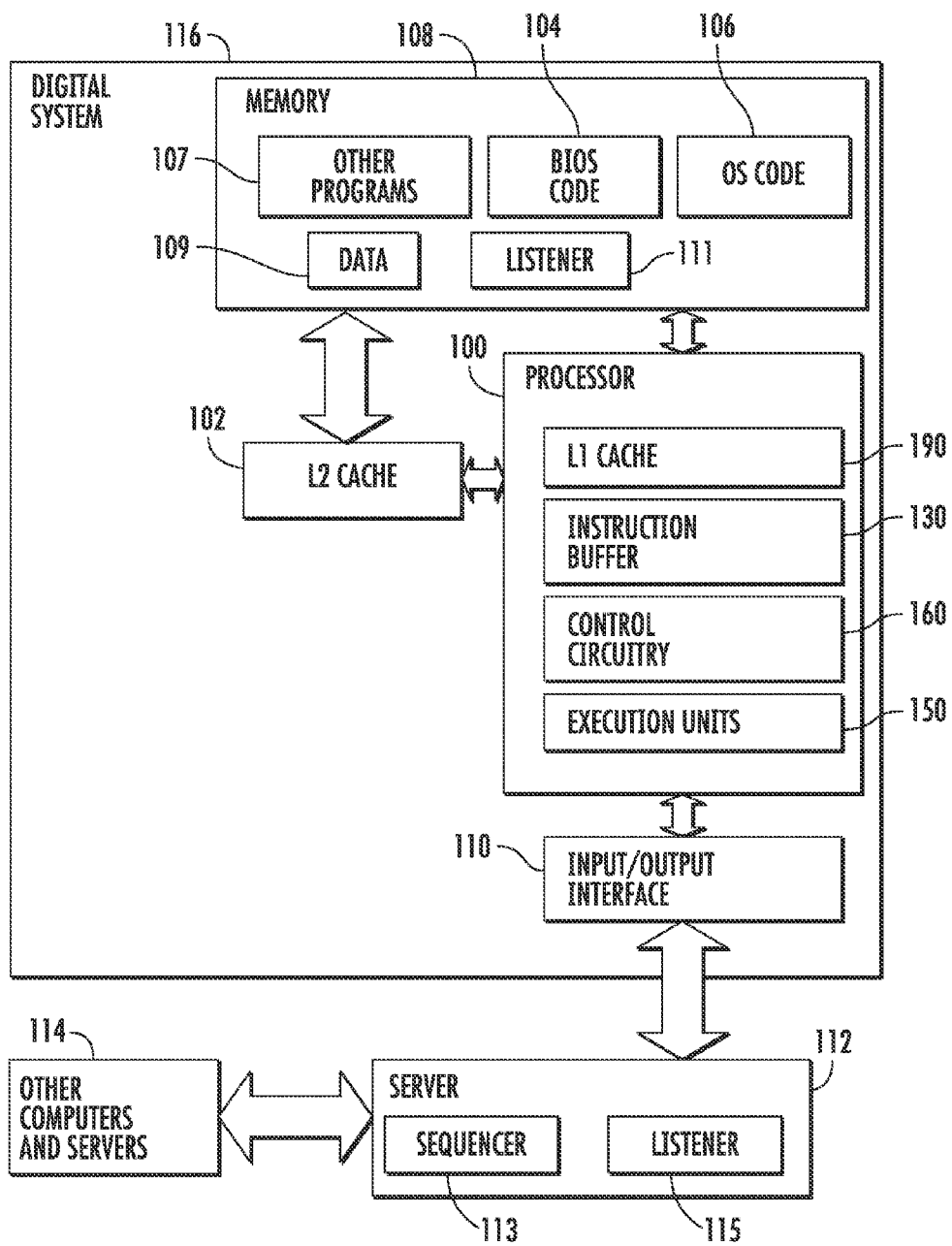
FIG. 1 is a schematic representation of a computer system.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The following is a detailed description of exemplary embodiments of the invention depicted in the accompanying drawings. The exemplary embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

What is described hereinafter relates to computer systems, methods and media for providing enhanced testing of systems proceeding through manufacture. In one embodiment, a plurality of digital systems are connected to a serving device. The serving device comprises one or more sequencers to originate environment attributes and commands to be executed by one or more systems under test (SUTs). A sequencer is used to control a sequence of commands required by each SUT. These commands may need to be executed on either the digital system under test or by servers on behalf of the digital system under test. Each digital system under test uses a listener with an associated server directory to receive commands and their associated environment. A listener is implemented as a program in a directory that is executed by an associated processor. A digital system under test sets the environment attributes and executes the received commands within the specified environment.

Before proceeding further with description of the technology on which this description will focus, it is deemed desirable to briefly describe the Service Processor(s) (SP) mentioned above and relate the functions of such a device to other elements of a system under test (SUT). A Service Processor is a micro-controller embedded on the system board of a computer system which may be used as a server, which enables the remote monitoring and management of the board. It has a completely separate life from the CPU, OS and any applications that might be running on the system and can be connected to a separate network (via ethernet).

A Service Processor can be understood as a nerve ending in the nervous system of a network. It complements management software agents that might run on the CPU of a computer system. In a number of ways it is a preferable mechanism for determining the status of the computer system than running a systems management software agent. A software agent will disappear without trace if the OS dies for any reason, including the failure of the CPU, and it can also die of its own accord. The Service Processor only dies if the electricity to the board it lives on dies.

A distinction between a Service Processor and a software agent is that the Service Processor is better placed to monitor hardware elements and firmware, whereas the system management agent is better placed to cover everything above those layers of the stack. For additional information, the interested reader is referred to IPMI, the Intelligent Platform Management Interface, an industry standard which was designed specifically to improve server management in mixed server environments. It allows the Service Processor to monitor the board it lives on and send out alerts or to run diagnostics over the network. A Service Processor can carry out data logging, set platform event traps, keep a system event log and provide remote access to the server via Virtual KVM (Keyboard, Video, Monitor). It's most important role though, is to monitor the health of its host device and support graceful shutdown, if it detects that a failure is probable. As will be understood, the SP performs these functions by executing code, sometimes called microcode or firmware. As with all code to be executed in computer system operations, such code is developed as a product is developed and the developing and developed code will undergo test. Such tests include testing on a manufacturing line in order to assure that a SP embedded in a system completing manufacture will function as designed and desired.

FIG. 1 shows a digital system 116 such as a computer or server implemented in a network according to one embodiment of the present invention. Digital system 116 comprises a processor 100 that can operate according to basic input-output system (BIOS) Code 104 and Operating System (OS) Code 106. The BIOS and OS code are stored in memory 108. The BIOS code is typically stored on Read-Only Memory (ROM) and the OS code is typically stored on the hard drive of computer system 116. Memory 108 also stores other programs for execution by processor 100 and stores data 109. Digital system 116 comprises a level 2 (L2) cache 102 located physically close to processor 100.

Processor 100 comprises an on-chip level one (L1) cache 190, an instruction buffer 130, control circuitry 160, and execution units 150. Level 1 cache 190 receives and stores instructions that are near to time of execution. Instruction buffer 130 forms an instruction queue and enables control over the order of instructions issued to the execution units. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions received from instruction buffer 130. Control circuitry 160 controls instruction buffer 130 and execution units 150. Control circuitry 160 also receives information relevant to control decisions from execution units 150. For example, control circuitry 160 is notified in the event of a data cache miss in the execution pipeline.

Digital system 116 also may include other components and subsystems not shown, such as: a SP, a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. Processor 100 also communicates with a server 112 by way of Input/Output Device 110. For example, I/O device 110 may comprise a network adapter. Server 112 may connect system 116 with other computers and servers 114. Thus, digital system 116 may be in a network of computers such as the Internet and/or a local intranet. Further, server 112 may control access to another memory 118 comprising tape drive storage, hard disk arrays, RAM, ROM, etc.

In one mode of operation of digital system 116, the L2 cache receives from memory 108 data and instructions expected to be processed in a pipeline of processor 100. L2 cache 102 is fast memory located physically close to processor 100 to achieve greater speed. The L2 cache receives from memory 108 the instructions for a plurality of instruction threads. Such instructions may include branch instructions. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Execution units 150 may comprise load/store units, integer Arithmetic/Logic Units, floating point Arithmetic/Logic Units, and Graphical Logic Units. Each of the units may be adapted to execute a specific set of instructions. Instructions can be submitted to different execution units for execution in parallel. In one embodiment, two execution units are employed simultaneously to execute certain instructions. Data processed by execution units 150 are storable in and accessible from integer register files and floating point register files (not shown). Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

Thus, the system of FIG. 1 may include a plurality of computers with processors and memory as just described, connected in a network served by a server. The server facilitates and coordinates communications between and among the computers in the network. Each computer has its own memory for storing its operating system, BIOS, and code for executing application programs, as well as files and data. The memory of a computer comprises Read-Only-Memory (ROM), cache memory implemented in DRAM and SRAM, a hard disk drive, CD drives and DVD drives. The server also has its own memory and may control access to other memory such as tape drives and hard disk arrays.

In an embodiment of the invention, a server 112 is in electrical communication with a plurality of computers to be tested. The server comprises a sequencer 113 that sends command messages to each computer under test to cause execution of certain steps and programs by a computer to verify correct operation. The sequencer 113 is implemented as a program in a directory that is executed by a processor of the server. Each command message from sequencer 113 specifies at least one environment and at least one command. Server 112 further comprises a listener 115. The system under test, for example, digital system 116, comprises a listener 111 that implements the environment specified in a received command message and executes a received command within the environment. A listener 111 is implemented as a program in a directory that is executed by processor 100.

Figure 2:
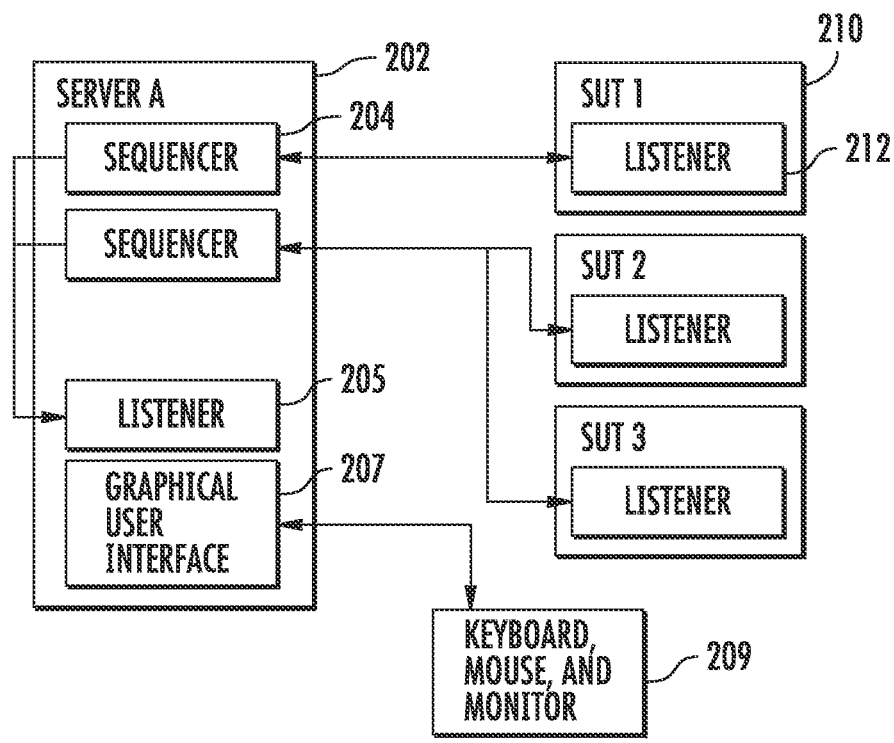
FIG. 2 is a schematic representation of a test arrangement for a plurality of computer systems.

FIG. 2 shows an embodiment for testing a plurality of Systems Under Test (SUT). A controlling server A, 202, comprises one or more sequencers 204. Each sequencer is a master command scheduling program. A sequencer 204 originates command messages that are transmitted to the SUTs 210. A sequencer 204 of server 202 may also originate command messages that are transmitted to a listener of the server itself. Each server and each SUT may be a digital system such as digital system 116. Each server and each SUT includes a listener 205, 212. Each listener comprises a command queue (such as a message file directory or communication socket) for receiving commands from a sequencer.

In FIG. 2, a single sequencer may originate command messages to a plurality of different listeners. Each SUT has a listener that receives commands from one or more sequencers 204. In one embodiment, a single listener in an SUT 210 may receive commands from a plurality of sequencers from a plurality of servers. Thus, each of a plurality of servers may have one or more sequencers and a listener. A listener of a first server can receive command messages from a sequencer of a second server and vice versa. Thus, embodiments can provide one-to-many and many-to-many correspondence between sequencers and listeners.

One example of an implementation of the embodiment of FIG. 2 is in a computer manufacturing and test environment. In this example, each system under test (SUT) 210 is a computer such as digital system 116 in a manufacturing line to be tested before final packing and shipping. Applying the methods herein described, each of a plurality of computers is connected to a server. Dozens or even hundreds of computers may be connected and tested at one time. The connection may, for example, be by Ethernet cable through a network adapter installed on each computer under test. Alternatively, the server may be connected wirelessly to each computer using means known in the art. In a wireless environment, both the server and the computers under test are equipped with transmitter and receiver circuitry to both transmit and receive command messages and result messages.

Thus, a server 202 with one or more sequencers supplies command messages to the individual ones of the plurality of computers 210. For example, a command may instruct a first SUT to execute a first program residing in the first SUT's memory, and may instruct a second SUT to execute a second program residing in the second SUT's memory. Thus, one computer may be running a first test program while another computer is running a second test program. Each respective test program is run in response to a command of a command message intended for the computer. In this way, multiple computers may be tested simultaneously and more rapidly under unified control by a single sequencer.

Figure 3:
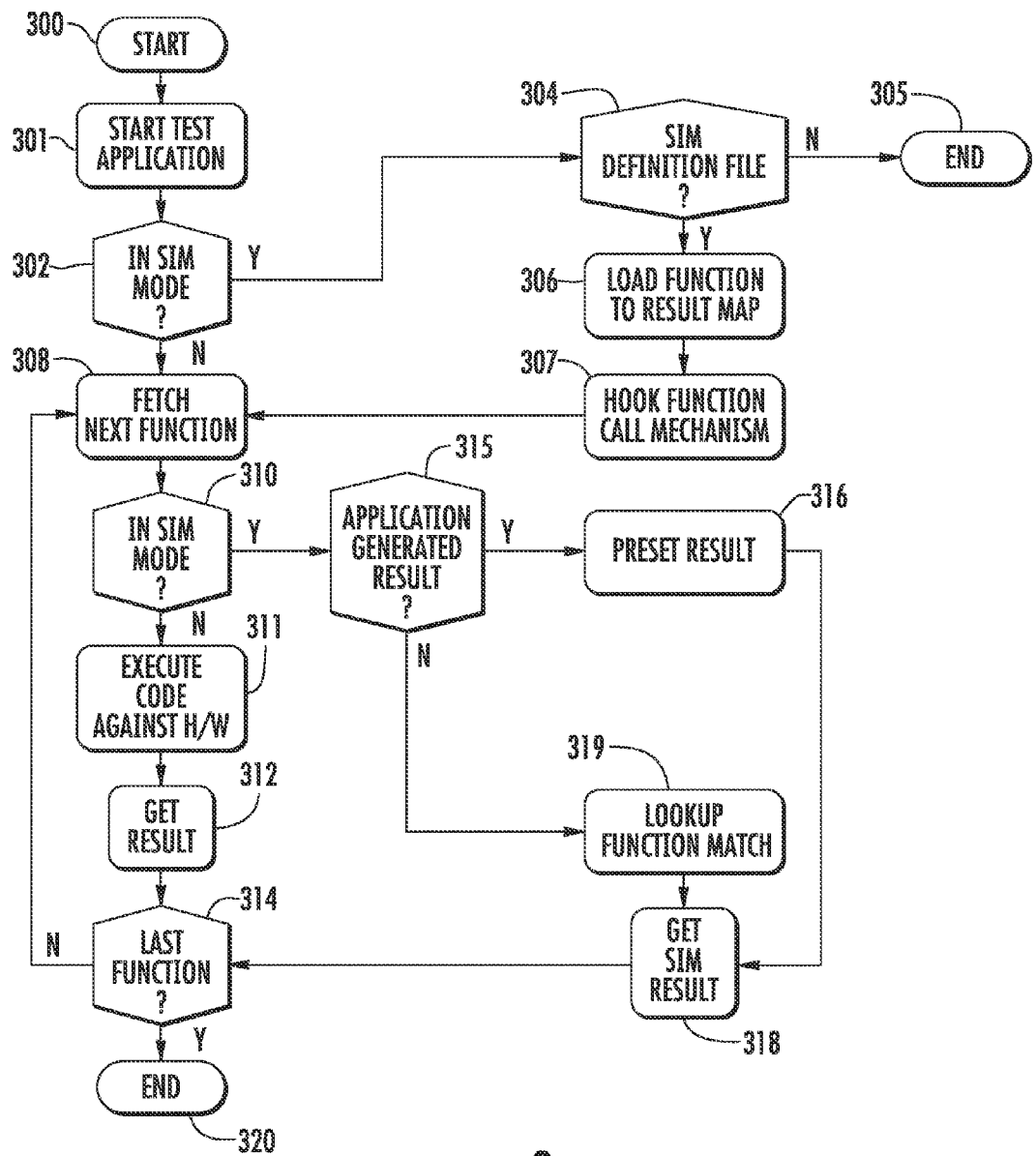
FIG. 3 is a flow chart representing the process flow of actions in practicing one embodiment of the technology here described.

Turning now towards FIG. 3, simulation mode capability is achieved in accordance with this invention by first defining a corresponding sim file for each desired test case. This file contains a list of functions to be simulated, parameters to each function, and corresponding output response of the functions. The technology here disclosed uses the hooks found in almost all interpreted languages to provide alternate logic for code importing and to provide code for function calls that are not initially defined. This allows:

a) simulation to take place with no change to original source code. The normal import of functions is suppressed and replaced by simulator logic if given external variable, environment, or command line parameter so dictates. This allows simulated response to be kept completely outside the source code in an external file.

b) the simulation engine to be a self contained module that requires no simulation logic in support of functions that are being simulated. This allows developers to not worry about simulation and it allows third-party modules, where source may not be available, to be simulated.

c) a variety of methods for defining simulated response. One is a linear list, where the list defines the simulated output return values to match the order that functions are called in the code logic. Each list element also contains optional attributes such as expected function name and input parameters for error checking and instruction on setting global error conditions. Another is a look-up table with function signatures as keys and the return values and global error conditions as values, where the signature can vary in specificity from just partial function name or module matching to full function name and varying definition of input parameters. Yet another is a combination of the preceding two types.

d) filtering of which functions are simulated by module and by individual function name based on an external simulator configuration file.

e) forcing a test application program to immediately return with no error conditions, when an external simulation file is not defined. This allows testing of logic external to programs (sequencing of programs with built-in simulation logic) even when no simulation data is available for individual programs.

Referring now more particularly to FIG. 3, a process flow begins at Start, indicated at 300, followed by initiation of a test application, indicated at 301. A decision point is then reached, at 302, regarding whether the process and test of an SUT is in simulation mode. If yes, then the presence of a simulation definition file is queried at 304. If none is found, then the test application terminates at 305. If a simulation definition file is found, then a map of function to result is loaded at 306 and the function call mechanism is hooked at 307. The process then returns to fetch the next function at 308. Should the decision point at 302 determine that the process and test is not in simulation mode, the steps 304, 306 and 307 are bypassed and the process proceeds to fetching the next function at 308.

After that next function is fetched, a second decision point is then reached, at 310, regarding whether the process and test of an SUT is in simulation mode. If no, then the test code is executed against the hardware of the SUT, at 311 (preferably by the service processor), to get a result at 312. A determination is then made, at 314, as to whether the function executed is the last function and, if not, the process loops back to step 308 for fetching the next function.

If it is determined at step 310 that the test is in simulation mode, then a determination is made as to whether the application generated a result, at 315. If yes, then the result generated is preset at 316 and reported as the simulation result through step 318 to the last function determination in step 314. If the application did not generate a result, at step 315, there is a look up for a function match at 319 and the result is reported as the simulation result through step 318 to the last function determination in step 314. The return of a simulation result, either from a preset or from a look up, is a substitute for executing code against the hardware as in step 311. When the last function has been processed, the test application terminates at 320.

Regarding execution of the code, the technology here disclosed may also be used where it is necessary to issue a call to a command and obtain a response to that command. This may implicate execution of code on a processor other than the service processor.

Before termination of the test application, the application will make the result available and indicate the state of the SUT. The result may be made available through being recorded for later analysis, stored, displayed, or used to initiate an alarm or notice to a supervisor of the test. Implementations of the technology here taught may extract specific values from the results or check to determine whether anticipated message are found in the results. It is contemplated that implementations may be adapted as designers of test suites may elect and may find appropriate or necessary to a manufacturing environment.

Figure 4:
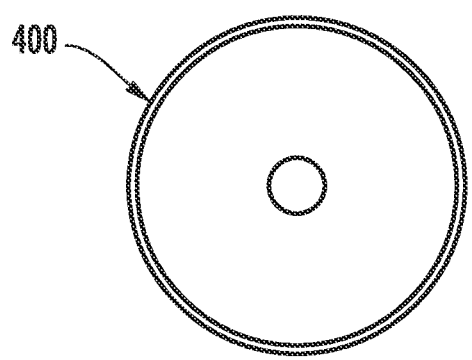
FIG. 4 is a representation of a computer readable medium on which is stored computer readable instructions for implementing the process flow of FIG. 3.

Computer code which is useful in implementing the technology here taught will be made available to computer systems by providing the code on a computer readable medium such as an optical disk as shown at 400 in FIG. 4.

The progression from starting the test application at 301 through the fetch 308, code execution 311, getting a result 312, last function determination 314 and loop back to completion is similar to prior practice. What is inserted by the technology here taught are the determination points for action in simulation mode and those steps which follow from a determination that simulation mode is available. This additional technology avoids the necessity of any change in the code which accomplishes testing where simulation mode is either not employed or unavailable. Further, moving the process steps which follow only from a determination that simulation mode is employed and available enables the simulation engine to be a self contained module that requires no simulation logic in support of functions that are being simulated.

In an effort to further exemplify implementation of the technology here taught, what follows are examples of code for a simulation file for a test case and for the test case file related to the installation of a national language into a SUT. It is to be noted that Perl's AUTOLOAD is used as the hook mechanism. Other programming language will have similar hook capabilities, and the skilled reader will recognize the applicability of the function in language other than that here illustrated. The simulation file comes first:

```
# Sim files are pseudo perl format. They allow easy setup with minimal
need to do "tricky" perl quoting. Each sim record has the format:

# function name
# [command] <= must have only when function starts with 'exec'
# attributes
```

```
# results <= Can be multiple lines

# The 'function name' and 'command' lines are not true perl expressions.
# You may use any quoting you wish on these lines and what you see is
# what you get (leading and trailing white space is stripped) and the
# command should look exactly how you would type it into the
# command line. The function name can be the splat char (*), in which
# case, this record will always match the called function (match always).

# The 'attributes' line is perl syntax and should define at least one
attribute.
# Attributes that can be set:
# testpass => 0 or 1 If set to zero an error will be logged and testpass( )
#          will return zero. This attribute is mandatory.
# greedy => 0 or 1 Determines how the simulator matches on 'command'
#          If set to 1, the command must match exactly. If set
#          to 0, the only the 'command' must only match
#          the beginning of the command being called.

# The 'results' entry is also perl expression. The simulator will read as
many
# lines as it needs until a valid expression is returned.

# Blank lines and comments between records (between 'function name'
and
# 'results' are allowed, but __not__ within the record itself.

# 'function name' and 'command' may have a perl style comment on
the
# same line

# Please retain this header when creating new Sim files for future
# reference.
FSPControl::FSPControl::execWithPaging
# Function name is execWithPaging cupdmfg -get__inst__list
# Param passed into function is "cupdmfg -get__inst__list (testpass=>1,
# greedy=>1);
# Options to force a function fail and specify greedy matching of the
param
# (0,<<'EOF');
# Specify return values for the function. In this case 2 values, rc and
output
# Languages Installed on Flash Side P
Number of Languages: 1
Index Language
0    English
2    French
3    German
4    Italian
8    Spanish
Languages Installed on Flash Side T
Number of Languages Installed 5
Index Language
0    English
2    French
3    German
4    Italian
8    Spanish
EOF
FSPControl::FSPControl::installLangs
# Function name is installLangs (testpass=>1, greedy=>1)
```

The test case file comes next:

```
my $client = new CTLPlatform::Client("instnls",\*DATA);
my $fsp = new FSPControl::FSPControl($client, 1);
my $fsp__cmd = "cupdmfg -get__inst__list";
my ($rc, $result) = (undef, undef);
# Execute cupdmfg -get__inst__list on the service processor
# In sim mode, the $result var will contain the results from the matching
sim file entry.
# If the unshiftSimResult call below is uncommented out, the results
passed to it
# would override the sim file results when in sim mode.
# So, $result would contain "Some alternate output" instead. This refers to
[040] 315
```

-continued

```
# unshiftSimResult(0, "Some alternate output");
($rc, $result) – $fsp->execWithPaging($fsp_cmd, 0, "LOG", 60);
If ($rc)
{
    $client->logError("<$fsp_cmd> failed with RC <$rc>");
    exit($client->logPendingStatus( ));
}
$rc = $fsp->installLangs((0, 2));
```

In the drawings and specifications there has been set forth a preferred embodiment of the invention and, although specific terms are used, the description thus given uses terminology in a generic and descriptive sense only and not for purposes of limitation.

What is claimed is:

1. A method comprising:
provising a test case software program;
determining whether the test case software program is to run in simulation mode;
responding to the determination that the test case software program is to run in simulation mode by determining whether a simulation definition file is available;
responding to the determination that a simulation mode is available for a test function by loading a parameter from a simulation definition file which has been determined to be available; and
obtaining a result of a test function from execution of the test case software program in simulation mode;
responding to the determination that a simulation mode is not available by executing the test case software program in original mode; and
obtaining a result of a test function from execution of the test case software program in original mode;
wherein the test case software program remains unmodified by the response to the determination of whether a simulation mode is available for a test function and the obtaining of a result and further wherein the results obtained by execution in simulation mode and in original mode are kept separate one from the other.

2. A method according to claim 1 further comprising:
responding to a determination that a simulation definition file is available by loading a result map and advancing to the fetch of the next test case software test function.

3. A method according to claim 1 further comprising:
responding to a determination that a simulation definition file is unavailable by terminating the test case software program.

4. A method according to claim 1 wherein the response of loading a parameter from a simulation definition file comprises determining whether a result has been generated by the test case software program and responding by one of (a) forwarding a preset result and (b) performing a look up in a table of function results.

5. A method according to claim 1 wherein the execution of the test case software program is performed by a service processor testing computer system hardware.

6. An apparatus comprising:
a computer system undergoing test;
a server computer system linked to the computer system undergoing test; and
computer code executing on said computer systems and effective when executing to:
provide a test case software program;
determine whether a the test case software program is to run in simulation mode;
respond to the determination that the test case software program is to run in simulation mode by determining whether a simulation definition file is available;
respond to the determination that a simulation mode is available for a test function by loading a parameter from a simulation definition file which has been determined to be available; and
obtain a result of a test function from execution of the test case software program in simulation mode
respond to the determination that a simulation mode is not available by executing the test case software program in original mode; and
obtain a result of a test function from execution of the test case software program in original mode;
wherein the test case software program remains unmodified by the response to the determination of whether a simulation mode is available for a test function and the obtaining of a result and further wherein the results obtained by execution in simulation mode and by execution in original mode are kept separate one from the other.

7. An apparatus according to claim 6 wherein said computer code when executing on said computer systems is effective to respond to a determination that a simulation definition file is available by loading a result map and advancing to the fetch of the next test case software test function.

8. An apparatus according to claim 6 wherein said computer code when executing on said computer systems is effective to respond to a determination that a simulation definition file is unavailable by terminating the test case software program.

9. An apparatus according to claim 6 wherein said computer code when executing on said computer systems is effective to respond in loading a parameter from a simulation definition file by determining whether a result has been generated by the test case software program and responding by one of (a) forwarding a preset result and (b) performing a look up in a table of function results.

10. An apparatus according to claim 6 further comprising a service processor and further wherein the execution of said code is performed by said service processor which is testing computer system hardware.

11. An apparatus comprising:
a non-transitory machine-readable medium;
computer code stored on said medium accessibly to computer systems and effective when executing on computer systems to:
provide a test case software program;
determine whether the test case software program is to run in simulation mode;
respond to the determination that the test case software program is to run in simulation mode by determining whether a simulation definition file is available;
respond to the determination that a simulation mode is available for a test function by loading a parameter from a simulation definition file which has been determined to be available; and
obtain a result of a test function from execution of the test case software program in simulation mode
respond to the determination that a simulation mode is not available by executing the test case software program in original mode; and
obtain a result of a test function from execution of the test case software program in original mode;
wherein the test case software program remains unmodified by the response to the determination of whether a simulation mode is available for a test function and the obtaining of a result and further wherein the results obtained by execution in simulation mode and by execution in original mode are kept separate one from the other.

12. An apparatus according to claim 11 wherein said computer code when executing on said computer systems is effective to respond to a determination that a simulation definition file is available by loading a result map and advancing to the fetch of the next test case software test function.

13. An apparatus according to claim 11 wherein said computer code when executing on said computer systems is effective to respond to a determination that a simulation definition file is unavailable by terminating the test case software program.

14. An apparatus according to claim 11 wherein said computer code when executing on said computer systems is effective to respond in loading a parameter from a simulation definition file by determining whether a result has been generated by the test case software program and responding by one of (a) forwarding a preset result and (b) performing a look up in a table of function results.

15. An apparatus according to claim 11 wherein said computer systems comprise a service processor and further wherein the execution of said code is performed by said service processor which is testing computer system hardware.

* * * * *